Figure 1:
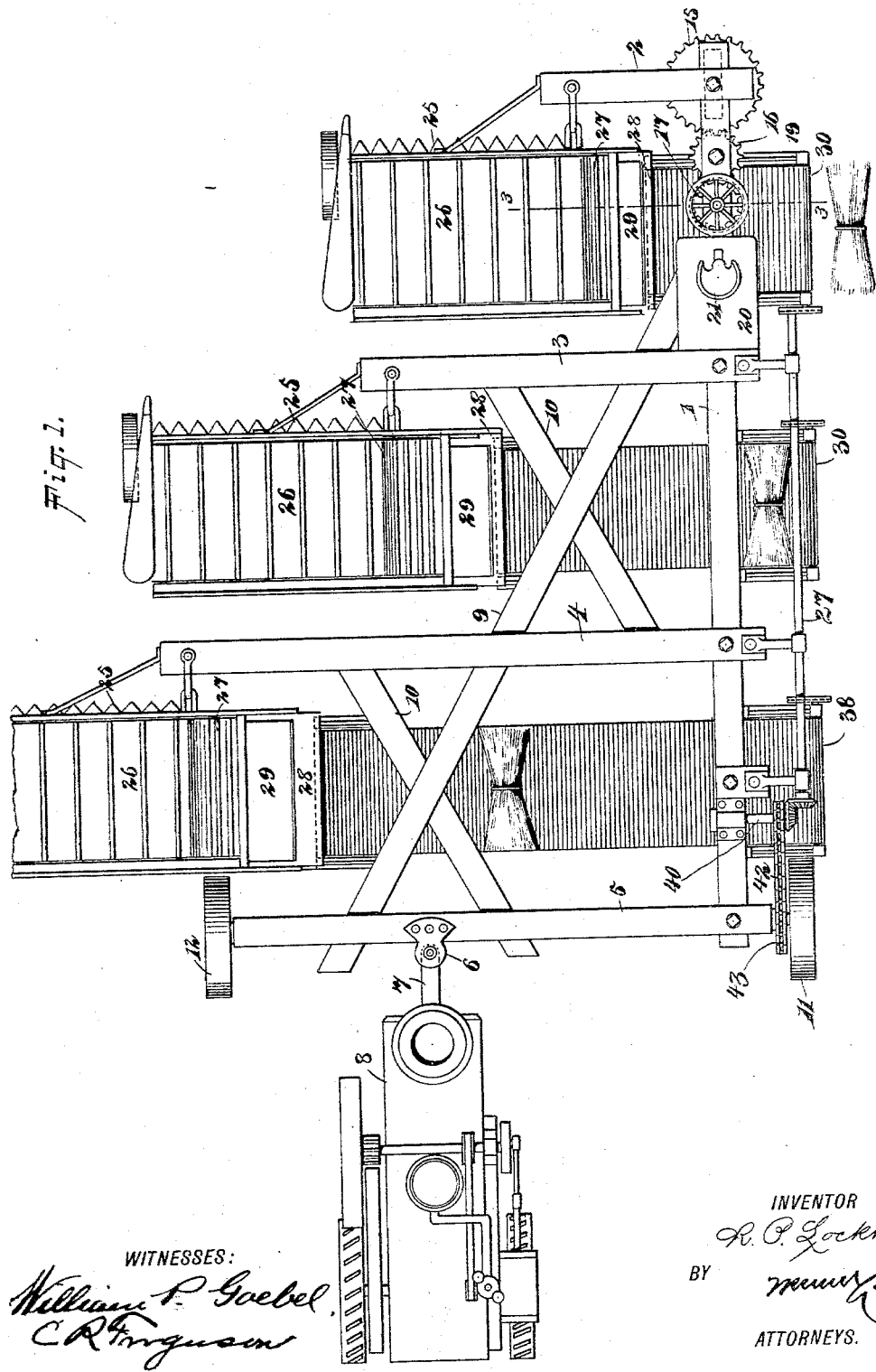

(No Model.) 2 Sheets—Sheet 1.

R. P. LOCKHART.
HARVESTER AND BINDER.

No. 571,619. Patented Nov. 17, 1896.

WITNESSES:
William P. Goebel
C. R. Ferguson

INVENTOR
R. P. Lockhart
BY
ATTORNEYS.

(No Model.) 2 Sheets—Sheet 2.
R. P. LOCKHART.
HARVESTER AND BINDER.
No. 571,619. Patented Nov. 17, 1896.
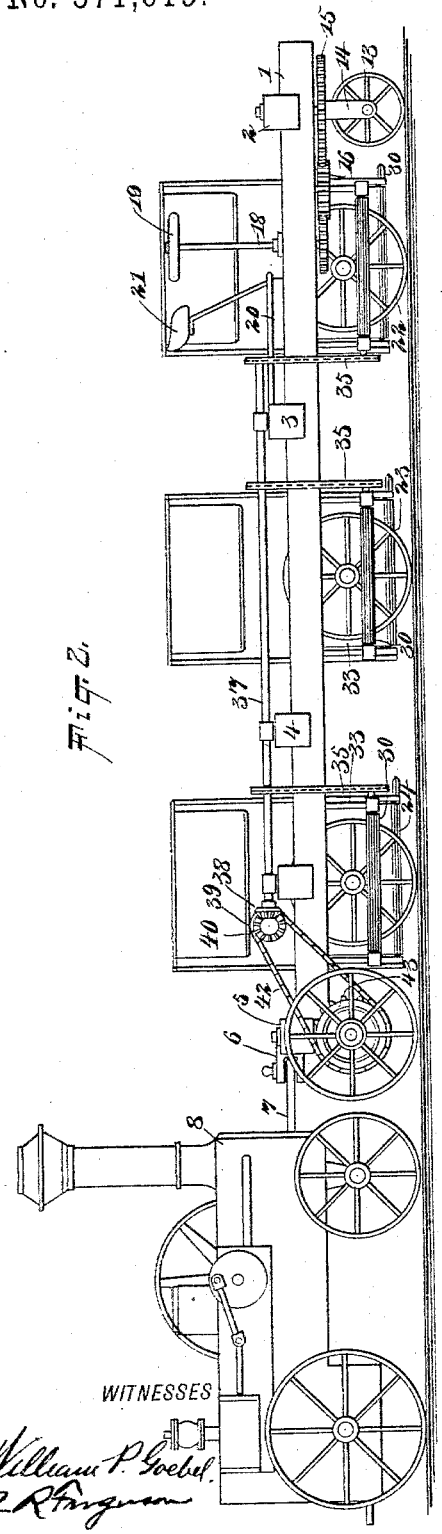
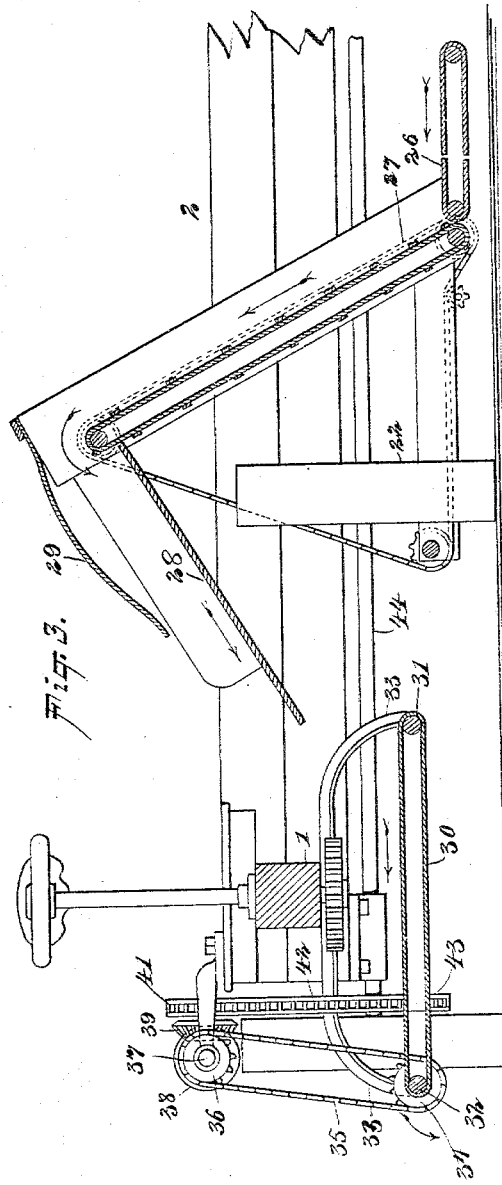
WITNESSES
William P. Goebel
C. R. Ferguson
INVENTOR
R. P. Lockhart
BY
ATTORNEYS.

UNITED STATES PATENT OFFICE.

ROBERT P. LOCKHART, OF PATOKA, INDIANA.

HARVESTER AND BINDER.

SPECIFICATION forming part of Letters Patent No. 571,619, dated November 17, 1896.

Application filed May 29, 1896. Serial No. 593,582. (No model.)

*To all whom it may concern:*

Be it known that I, ROBERT P. LOCKHART, of Patoka, in the county of Gibson and State of Indiana, have invented certain new and useful Improvements in Harvesters and Binders, of which the following is a full, clear, and exact description.

This invention relates to harvesting-machines of the class having self-binder attachments and adapted to be drawn or pushed by a traction-engine; and the object is to provide a machine by which a number of very wide swaths may be cut as the machine moves across a field and by means of which the grain, after binding, will be deposited in line on the ground at the side opposite the reapers.

I will describe a machine embodying my invention, and then point out the novel features in the appended claims.

Reference is to be had to the accompanying drawings, forming a part of this specification, in which similar characters of reference indicate corresponding parts in all the figures.

Figure 1 is a plan view of a machine embodying my invention. Fig. 2 is a side elevation thereof; and Fig. 3 is a section through the line 3 3 of Fig. 1, drawn on an enlarged scale.

The frame of the machine comprises a longitudinal beam 1 and transverse beams 2, 3, and 4, the said transverse beams successively increasing in length to accommodate them to the increasing lateral projection of the binders.

To the rear end of the beam 1 is attached a transverse beam 5, having a coupling-plate 6 to be engaged by a push-bar 7, extended from a traction-engine 8 of any approved construction. The several frame-beams may be braced by crossed beams 9 and 10.

The rear portion of the frame is supported on wheels 11 12, and the front portion is supported by a steering-wheel 13. This steering-wheel 13 has its journal-bearings in a hanger 14, having a shank portion extended upward through the front end of the beam 1 and adapted to rotate. On the hanger 14 is mounted a horizontally-disposed gear-wheel 15, meshing with a gear-wheel 16, which in turn meshes with a gear-wheel 17, mounted on a steering-shaft 18, extended upward through the beam 1 and having a hand-wheel 19 on its upper end. Rearward of the steering-shaft is a platform 20, on which is mounted a seat 21. The frame may be further supported by the binder-wheels 22, 23, and 24.

Attached to each transverse beam 2, 3, and 4 is a reaper and binder, and as these devices are all of similar construction, excepting that they progressively increase in lateral projection, a detail description of one will answer for all. The reaper and binder comprise a cutter mechanism 25, rearward of which is an endless carrier 26, movable horizontally and designed to convey the cut grain to a vertically-disposed endless conveyer 27, designed to carry the grain upward and deposit it on a downwardly-inclined binder-table 28. The carriers or conveyers are operated in the usual manner, and as the binder mechanism to operate on the table 28 may be of any well-known construction I have not deemed it necessary to show it. Above the binder-table is a guide-plate 29. The usual side boards are provided for the table, and the usual side boards are also provided for the conveyer 27.

From the binding-table the grain falls onto an endless belt-carrier 30, extended around rollers 31 32, having journal-bearings in arms 33 extended downward from the main frame. The several carrier-belts extend outward beyond the side of the main frame, and they are all operated by the rear wheels. A journal of each outer roller 32 is provided with a sprocket-wheel 34, from which a sprocket-chain 35 extends to a sprocket-wheel 36, mounted on a shaft 37, extended longitudinally of the machine and having at its rear end a bevel-gear 38, meshing with a bevel-gear 39 on a short shaft 40. On this short shaft 40 is a sprocket-wheel 41, having a chain connection 42 with a sprocket-wheel 43 on the axle 44 of the wheels 11 and 12. It will be seen by this construction that as the machine moves forward the several carrier-belts will be operated to deposit the grain in a row ready to be shocked.

The engine is attached to the rear of the machine, thereby getting the power close to the greatest weight. Consequently the draft or power will be less and there will be no side draft on machine or engine.

Having thus described my invention, I claim as new and desire to secure by Letters Patent—

1. A harvester and binder, comprising a frame having a longitudinal beam and transverse beams successively increasing in length, reapers attached to the frame and successively increasing in lateral projection, a binder-table for each reaper, conveyers for carrying the cut grain to the tables, endless belts for receiving the bound grain from the tables, means for operating the belts, and a traction-engine connected to the rear of the machine, substantially as specified.

2. A harvester and binder, comprising a main frame, supporting-wheels for the same, a steering-wheel, a steering-shaft, gear connections between the steering shaft and wheel, reapers supported by the frame and successively increasing in lateral projection, binder-tables for receiving cut grain from the reapers, carrier-belts for receiving bundled grain from the tables, a shaft extended longitudinally of the machine, means for rotating said shaft from the rear wheels, sprocket-wheels on the shaft, and sprocket-chains extended therefrom to sprocket-wheels on the journals of the carrier-belts, substantially as specified.

3. A harvesting apparatus, having a frame, and a series of harvesting and binding machines carried by the frame, the cutting mechanism and platforms of each machine being out of longitudinal alinement, and the conveyers of each machine being graduated in length so that the sheaves from the several machines may be delivered in alinement, substantially as described.

ROBERT P. LOCKHART.

Witnesses:
G. M. EMMERSON,
E. R. MUXANN.